United States Patent [19]
Birk et al.

[11] Patent Number: 5,518,100
[45] Date of Patent: May 21, 1996

[54] APPARATUS FOR COMPENSATING FOR FLUCTUATIONS OF TORQUE

[75] Inventors: Albert Birk, Bühl-Vimbuch; Johann Jäckel, Baden-Baden, both of Germany

[73] Assignee: LuK Lamellen und Kupplungsbau GmbH, Bühl, Germany

[21] Appl. No.: 163,911

[22] Filed: Dec. 7, 1993

[30] Foreign Application Priority Data

Dec. 7, 1992 [DE] Germany ............... 42 41 087.8

[51] Int. Cl.⁶ ............... F16D 47/02; F16D 3/80; F16D 13/60; F16F 15/30
[52] U.S. Cl. ............... 192/208; 74/574; 192/30 W; 192/212; 464/67
[58] Field of Search ............... 192/30 W, 106.2, 192/208, 214, 212; 74/574; 464/24, 67

[56] References Cited

U.S. PATENT DOCUMENTS

| | | | |
|---|---|---|---|
| 3,456,499 | 7/1969 | South | 74/572 X |
| 4,493,409 | 1/1985 | Steeg | 192/30 W X |
| 4,723,463 | 2/1988 | Reik et al. | |
| 4,908,003 | 3/1990 | Kobayashi et al. | 192/106.2 X |
| 4,934,501 | 6/1990 | Gay et al. | 192/30 W X |
| 5,029,678 | 7/1991 | Koshizawa | 192/30 W X |
| 5,156,249 | 10/1992 | Friedmann | |
| 5,160,007 | 11/1992 | Reik et al. | |
| 5,161,660 | 11/1992 | Huber | |
| 5,261,516 | 11/1993 | Friedmann | 74/574 X |
| 5,273,372 | 12/1993 | Friedmann et al. | 192/106.2 X |
| 5,293,977 | 3/1994 | Friedmann | 74/574 X |
| 5,293,978 | 3/1994 | Reik et al. | 74/574 X |
| 5,295,910 | 3/1994 | Friedmann | 464/67 X |

FOREIGN PATENT DOCUMENTS

| | | | |
|---|---|---|---|
| 0163828 | 9/1983 | Japan | 192/30 W |
| 2144810 | 3/1985 | United Kingdom | 192/30 W |
| 2219647 | 12/1989 | United Kingdom | 192/106.2 |

Primary Examiner—Rodney H. Bonck
Attorney, Agent, or Firm—Darby & Darby

[57] ABSTRACT

A composite flywheel having coaxial primary and secondary flywheels, which can turn relative to each other against the opposition of one or more friction generating devices and/or dampers, employs a substantially cup-shaped carrier with one or more signal generators in the form of notches, recesses, grooves, holes, projections or the like. The carrier includes a radially inwardly extending washer-like portion and a sleeve-like portion, which sleeve-like portion is in one piece with the radially outermost part of the washer-like portion. The signal generator(s) is (are) provided in or on that part of the sleeve-like portion which projects outwardly beyond a sleeve-like part of the radially outer end portion of the primary flywheel. The sleeve-like part of the end portion of the primary flywheel surrounds and confines the washer-like portion and is welded to the sleeve-like portion of the carrier.

28 Claims, 2 Drawing Sheets

APPARATUS FOR COMPENSATING FOR FLUCTUATIONS OF TORQUE

BACKGROUND OF THE INVENTION

The invention relates to improvements in apparatus which can compensate for fluctuations of torque, particularly for fluctuations of torque that is transmitted by a prime mover, e.g., the combustion engine of a motor vehicle. Still more particularly, the invention relates to improvements in apparatus wherein a composite flywheel comprises two discrete flywheels including a first flywheel serving to receive torque from an engine or another prime mover and a second flywheel which transmits torque to an input element (e.g., a shaft) of a transmission in the power train between the engine and the driven part or parts, for example the wheels, of a motor vehicle. Such apparatus normally further comprises a bearing between the two discrete flywheels and one or more dampers or analogous devices which oppose rotation of the first and second flywheels relative to each other.

Apparatus of the above-outlined character have found wide acceptance in the automobile manufacturing and other industries, in spite of the fact that they employ composite flywheels and bearings as well as dampers and/or friction generating devices between the discrete flywheels, i.e., in spite of the fact that they are more expensive than conventional apparatus wherein a single flywheel is interposed between a prime mover and a transmission (normally between the prime mover and a friction clutch which transmits torque to the input element of the transmission).

OBJECTS OF THE INVENTION

An object of the invention is to provide a novel and improved apparatus which employs a composite flywheel and can be utilized to transmit torque in motor vehicles and elsewhere as a superior substitute for conventional multiple-flywheel apparatus.

Another object of the invention is to provide an apparatus which is more versatile than heretofore known apparatus.

A further object of the invention is to provide an apparatus wherein the breaking up of angular momentums, including those of the primary and secondary flywheels of the composite flywheel, can readily conform to the requirements.

An additional object of the invention is to provide a novel and improved method of assembling the above-outlined apparatus.

Still another object of the invention is to provide an apparatus whose cost does not appreciably exceed the cost of heretofore known apparatus employing composite flywheels.

A further object of the invention is to provide an apparatus whose constituents can be mass-produced in available machines by utilizing small quantities of raw materials and/or simple blanks.

Another object of the invention is to provide an apparatus with an assembly that enables the apparatus to be put to use in performing one or more additional functions.

An additional object of the invention is to provide an apparatus whose useful life is longer than that of heretofore known apparatus.

Still another object of the invention is to provide a novel and improved method of providing a twin-flywheel apparatus with novel and improved means for carrying one or more markers and/or other signal generators.

A further object of the invention is to provide a power train which employs an apparatus of the above-outlined character.

Another object of the invention is to provide a motor vehicle which employs the improved apparatus.

An additional object of the invention is to provide an apparatus which exhibits the above-outlined advantages and which can be put to use for long periods of time without necessitating frequent inspection and/or repair.

SUMMARY OF THE INVENTION

The invention is embodied in an apparatus for compensating for variations or fluctuations of torque, particularly for compensation of fluctuations of torque that is transmitted by an internal combustion engine in a motor vehicle. The improved apparatus comprises a composite flywheel assembly having a plurality of coaxial flywheels including a first flywheel connectable with an output element (e.g., a crankshaft) of an engine and a second flywheel connectable with an input element (e.g., a shaft) of a variable-speed transmission and having a friction surface engageable by a clutch disc or clutch plate of a friction clutch. The flywheels are rotatable relative to each other about the common axis of the flywheels and the improved apparatus further comprises a bearing (e.g., an antifriction ball or roller bearing) located between the first and second flywheels, at least one damper which includes means for opposing rotation of the first and second flywheels relative to each other, and a substantially collar-shaped carrier which is rigid with the first flywheel. The carrier extends in parallel with the common axis of the flywheels in the direction away from the engine, and extends beyond the friction surface of the second flywheel.

The carrier is provided with at least one signal generator. The at least one signal generator can include or constitute a recess in the carrier.

The carrier can include an annular portion having a first thickness - as seen in the radial direction of the common axis of the flywheels - and the at least one signal generator can have a second thickness (e.g., zero thickness) less than the first thickness. The at least one signal generator can be provided in the annular portion of the carrier and can be obtained as a result of removal of material from the annular portion.

If the at least one signal generator is provided with a recess, such recess can have an open side facing away from the engine.

The carrier can be made, at least in part, of a metallic material, e.g., of sheet metal, and such carrier can have a substantially L-shaped cross-sectional outline. In accordance with a presently preferred embodiment of the invention, the carrier constitutes a converted substantially cup-shaped blank of ductile material.

The carrier can comprise a plurality of portions having different diameters.

The first flywheel can include a portion extending in the direction of the common axis of the flywheels, and the apparatus can further comprise means for securing the just mentioned portion of the first flywheel to the carrier. Such connecting means can include rivets, bolts, screws, a bayonet mount or the like. The aforementioned portion of the first flywheel can at least partially surround the carrier and the carrier can be centered by such portion of the first flywheel. The carrier can extend into the aforementioned portion of the first flywheel and the carrier or the aforementioned portion of the first flywheel can include means for limiting the extent of penetration of the carrier into the aforementioned portion of the first flywheel.

The preferably annular portion of the first flywheel can surround at least a portion of and can be sealingly connected with the carrier. Such portions of the carrier and the first flywheel can be sealingly connected to each other by at least one welded seam. The first flywheel preferably further comprises a main portion which is of one piece with the annular portion of such first flywheel.

The first flywheel can constitute a converted blank of sheet metal, and the blank can constitute a substantially cupped piece of metallic sheet material.

The carrier can include a portion which extends substantially radially toward the common axis of the flywheels and can include abutments for resilient elements (e.g., in the form of elongated arcuate coil springs) forming part of the at least one damper and acting in the circumferential direction of the flywheels.

The carrier and at least one of the first and second flywheels (e.g., the first flywheel) can define an annular chamber, and the carrier can include a portion which seals the chamber (or the adjacent part of the chamber) from the surrounding atmosphere. The apparatus can further comprise at least one sealing element which engages the just mentioned portion of the carrier. The at least one sealing element can include a membrane.

If the at least one damper comprises a plurality of energy storing elements which act in the circumferential direction of the flywheels, the carrier and at least one of the flywheels (such as the first flywheel) can define an at least partially sealed annular chamber for the energy storing elements of the at least one damper. Such apparatus preferably further comprises a supply of lubricant in the chamber. At least a portion of the just described carrier can be made of a suitable metallic material.

The first flywheel can comprise two profiled components of metallic sheet material, and such components define an annular chamber for the energy storing elements of the at least one damper. The components of the first flywheel can include portions extending in the direction of the common axis of the flywheels and away from the engine. The energy storing elements can be disposed at a first radial distance from the common axis of the flywheels and the aforementioned portions of the two components are preferably located at a greater second distance from such axis.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
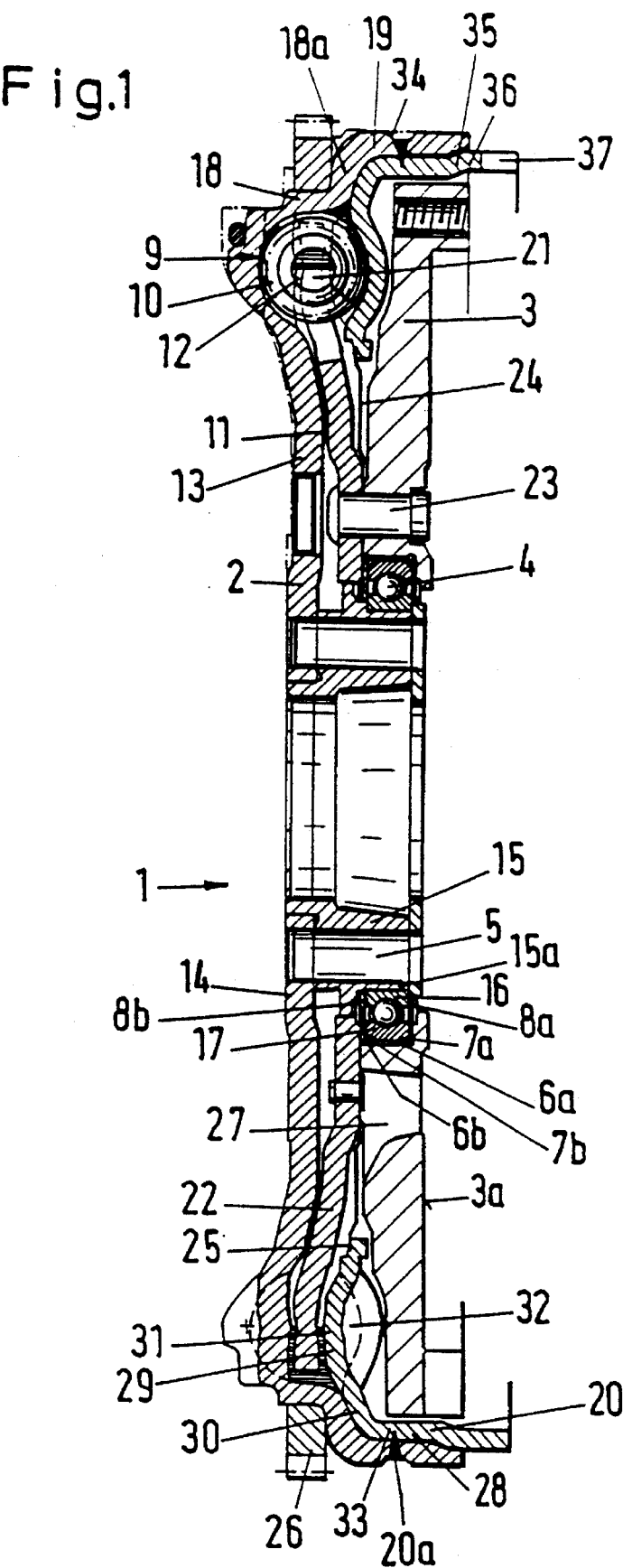
FIG. 1 is a schematic axial sectional view of an apparatus which embodies one form of the invention and employs two flywheels.
Figure 2:
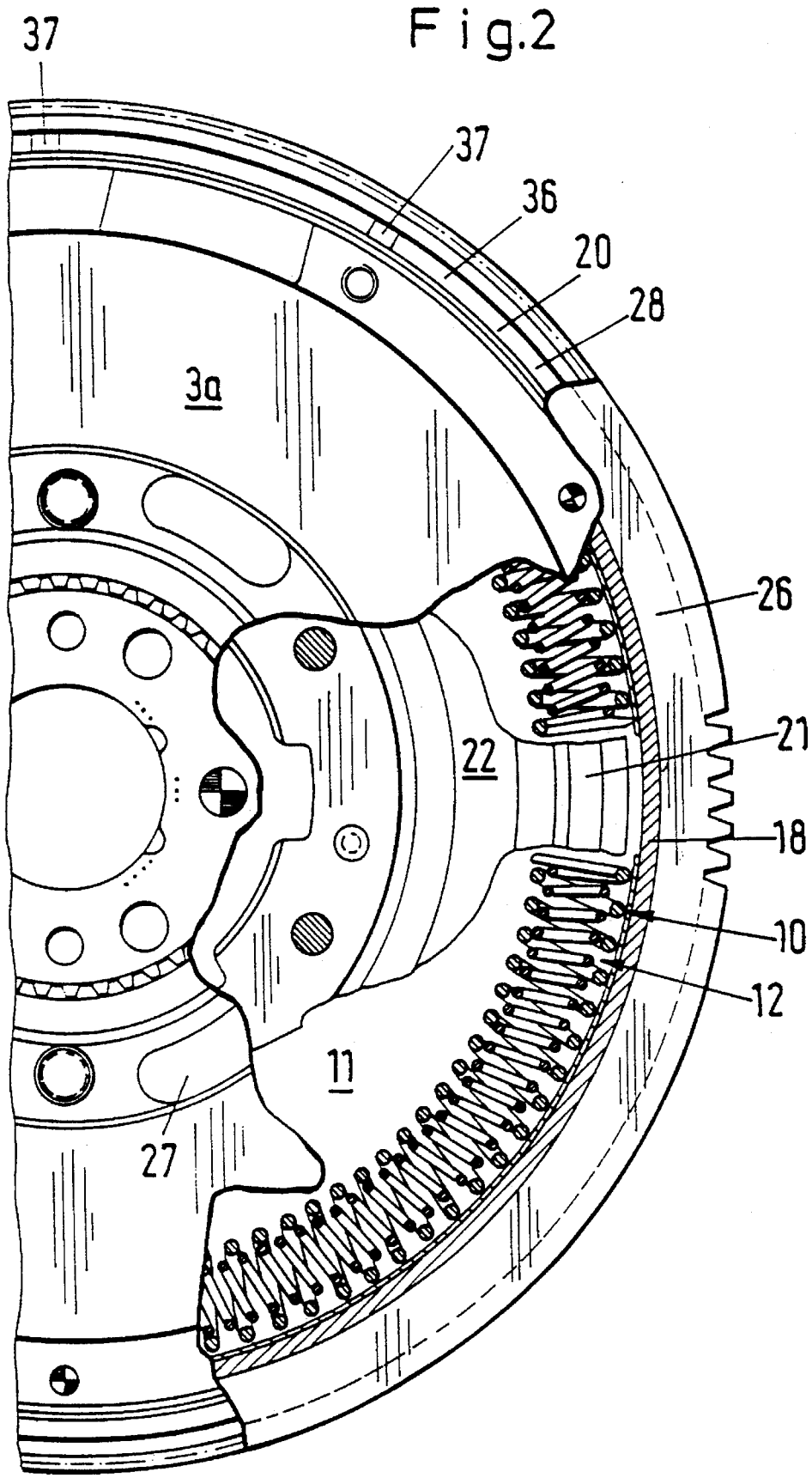
FIG. 2 a fragmentary elevational view of the apparatus as seen from the right-hand side of FIG. 1, with certain parts omitted and certain parts broken away.

FIGS. 1 and 2 illustrate certain details of an apparatus which can be utilized to transmit torque between the output element of an engine and the input element of a variable-speed transmission in a motor vehicle. More particularly, the apparatus is designed to compensate for fluctuations of torque that is being transmitted from a first or primary flywheel 2 to a second or secondary flywheel 3 of a composite flywheel unit or assembly 1. The primary flywheel 2 can be separably affixed to the output element (e.g., a crankshaft) of the engine by bolts or other suitable fasteners (not shown) extending through an annulus of axially parallel bores or holes 5 in the hub 15 of the flywheel 2. The secondary flywheel 3 is coaxial with and is rotatable relative to the primary flywheel 3 and constitutes the counterpressure plate of a friction clutch serving to transmit torque from the flywheel 3 to the input element (such as a shaft) of the variable-speed transmission (not shown). Reference may be had, for example, to commonly owned U.S. Pat. No. 4,723, 463 granted Feb. 9, 1988 to Reik et al. for "Assembly for Taking Up and Compensating for Torque-Induced Shocks". This patent shows a connection between the engine and the primary flywheel as well as a friction clutch embodying a counterpressure plate which corresponds to the secondary flywheel 3 in the apparatus of the present invention. The friction clutch includes a clutch disc or clutch plate having two sets of friction linings, and one set of the friction linings is caused to bear against the friction surface 3a of the secondary flywheel 3 when the clutch receiving torque from the apparatus of the present invention is engaged, namely when a pressure plate is caused to bear against the other set of friction linings so that the secondary flywheel can drive the input element of the transmission by way of the clutch disc. The latter can comprise a rigid disc-shaped holder which is directly connected with the friction linings (reference may be had to the aforementioned patent to Reik et al.). Alternatively, the clutch disc can comprise a composite holder for friction linings, e.g., a holder comprising two resilient discs which are caused to store energy during engagement of the friction clutch and to dissipate energy when the friction clutch is in the process of interrupting the transmission of torque from the counterpressure plate to the pressure plate. Such clutch discs are described and shown in numerous patents which are owned by the assignee of the present application. Still further, the clutch disc which receives torque from the flywheel 3 in the apparatus of the present invention can be constructed and assembled in a manner as disclosed, for example, in commonly owned U.S. Pat. No. 5,161,660 granted Nov. 10, 1992 to Huber for "Clutch Plate With Plural Dampers". The clutch plate of Huber employs one or more dampers between the holder of the friction linings and the hub. It is further possible to install one or more friction generating devices between the hub and the holder of the friction linings; such friction generating device or devices can be utilized in lieu of or in addition to dampers of the type disclosed in the patent to Huber.

The flywheels 2, 3 are rotatable with and relative to each other about a common axis. An antifriction ball bearing 4 including a single row of spherical rolling elements is installed between the hub 15 of the primary flywheel 2 and the adjacent radially innermost portion of the secondary flywheel 3. The illustrated bearing 4 is installed radially outwardly of the bores or holes 5 which are provided in the hub 15 to receive the shanks of fasteners serving to secure the primary flywheel 2 to the output element of the engine. The inner race 16 of the bearing 4 engages the hub 15 of the flywheel 2 and the outer race 17 of such bearing is surrounded by the radially inner portion of the flywheel 3. Two sealing elements in the form of caps (shown at 6a and 6b) are provided to confine the lubricant for the rolling elements in the space between the races 16 and 17 as well as to constitute a thermal barrier which reduces the likelihood of transmission of excessive amounts of heat from the secondary flywheel 3 to the adjacent parts (including the primary flywheel) of the improved apparatus. The secondary flywheel 3 is heated as a result of engagement and disengagement of the friction clutch, including the linings which are adjacent the friction surface 3a. Sealing elements 7a, 7b (e.g., in the form of O-rings) are interposed between the caps 6a, 6b and the adjacent portions of the outer race 17. The radially inner portions of the caps 6a, 6b are biased toward the adjacent axial ends of the inner race 16 by diaphragm springs 8a and 8b, respectively.

The improved apparatus further comprises a damper 9 which serves to oppose rotation of the flywheels 2 and 3 relative to each other. The damper 9 comprises arcuate energy storing elements 10 in the form of coil springs which are confined in an annular compartment 12 constituting the radially outermost part of an annular chamber 11. The latter is defined in part by the flywheel 2 and is at least partially filled with a lubricant, preferably a grease or another substance exhibiting a relatively high viscosity. However, it is equally within the purview of the invention to employ a suitable oil in lieu of grease.

The primary flywheel 2 comprises a substantially radially extending main portion or section 13 which is (or which can be) made of suitable metallic sheet material or which can be obtained by drawing or another procedure involving the conversion of metallic blanks into primary flywheels. The main section 13 of the primary flywheel 2 is or can be directly bolted or otherwise affixed to the output element of an engine or another prime mover by fasteners whose shanks extend through the holes or bores 5 of the hub 15 when the flywheel 2 is properly mounted on the output element of the prime mover. A portion of the aforementioned annular chamber 11 and its compartment 12 is defined in part by the main section 13 of the primary flywheel 2.

The radially inner portion 14 of the main section 13 is shown as being of one piece with the aforementioned hub 15. The portion 14 extends substantially radially of the common axis of the flywheels 2, 3. The hub 15 includes an end portion 15a which is remotest from the engine and is surrounded by the inner race 16 of the antifriction bearing 4. The outer race 17 of this bearing and the radially outermost portions of the caps 6a, 6b are confined in the centrally located through bore or hole of the secondary flywheel 3. The flywheel 3 can also constitute a suitably deformed blank of metallic sheet material.

The radially outer portion 18 of the main section 13 of the primary flywheel 2 surrounds a substantial part of the annular compartment 12 (and hence the energy storing elements 10 of the damper 9) and includes a washer-like part 18a which extends radially outwardly of the common axis of the flywheels 2,3. The part 18a merges into a sleeve-like part 19 which extends in parallel with the axis of the composite flywheel 1 and is welded (as at 20a) to the adjacent substantially cylindrical portion 33 of a collar-shaped carrier 20. The sleeve-like part 19 of the primary flywheel 2 surrounds a substantial part of the carrier 20. The dimensions of the outer portion 18 are selected in such a way that it surrounds the major part of the damper 9 and its energy storing elements 10 in the compartment 12.

The carrier 20 can constitute a converted blank of metallic sheet material and is surrounded by that part (19) of the end portion 18 which is remotest from the prime mover (the prime mover is assumed to be located to the left of the main section 13, as viewed in FIG. 1). The carrier 20 has a substantially L-shaped cross-sectional outline and is centered within the part 19 of end portion 18 of the main section 13 of the primary flywheel 2. The welded connection 20a between the part 19 and the carrier 20 can constitute a circumferentially complete seam which establishes a fluid-tight connection as well as a strong mechanical bond between the primary flywheel 2 and the carrier 20.

As can be seen in FIG. 1, the carrier 20 includes a substantially cylindrical sleeve-like portion 28 and a radially inwardly extending washer-like portion 29 bounding the adjacent portion of the annular chamber 11 and its compartment 12. The latter is subdivided into a plurality of arcuate portions each of which contains an arcuate energy storing element 10. The neighboring arcuate portions of the compartment 12 are partially separated from each other by partitions including a first set of partitions which are of one piece with the end portion 18 of the main section 13 of the primary flywheel 2 and a second set of partitions 31 of one piece with the radially inwardly extending washer-like portion 29 of the carrier 20. The partitions of the end portion 18 and carrier 20 serve as retainers for the adjacent end convolutions of the respective energy storing elements 10. It is presently preferred to form partitions by deforming the corresponding parts of the end portion 18 and washer-like portion 29, namely by providing the outer side of the end portion 18 and the right-hand side of the radially extending portion 29 of the carrier 20 with depressions or pockets. FIG. 1 merely shows a single pocket 32 which is provided in the radially inwardly extending portion 29 of the carrier 20 opposite the respective projection 31. Reference may be had, for example, to commonly owned U.S. Pat. No. 5,156,249 granted Oct. 20, 1992 to Friedmann for "Torque Transmitting Apparatus with Axially Deformable Primary Flywheel" which describes and shows pockets in neighboring parts of the apparatus to define internal partitions serving as abutments or retainers for end convolutions of coil springs which are confined in an annular compartment adjacent the primary flywheel.

The secondary flywheel 3 carries at least one flange-like member 22 having radially outwardly extending arms 21 which alternate with the energy storing elements 10 of the damper 9 and cause such energy storing elements to store energy (or to store additional energy) when the flywheel 2 is caused to turn relative to the flywheel 3 and/or vice versa. The flange 22 serves to transmit torque from the energy storing elements 10 (i.e., from the primary flywheel 2) to the secondary flywheel 3 when the primary flywheel 2 is driven by the prime mover. For example, the flange 22 can be provided with a set of four equidistant arms 21 which extend radially outwardly of the main or central portion of the flange (see FIG. 2) and between the neighboring pairs of energy storing elements 10. When the improved apparatus is idle (i.e., when the primary flywheel 2 does not transmit torque to the secondary flywheel 3), each arm 21 is preferably located between a partition of the end portion 18 and a partition 32 of the radially inwardly extending portion 29 of the carrier 20.

The illustrated circumferentially complete flange 22 can be replaced by a plurality of discrete segments which are affixed to the secondary flywheel 3 and each of which carries one or more arms 21. Alternatively, such discrete segments can be affixed to a support which, in turn, is affixed to the secondary flywheel 3.

That side of the secondary flywheel 3 which faces away from the friction surface 3a can be provided with grooves, channels, recesses, depressions, ribs, protruding pins or other formations which enlarge the left-hand side of the secondary flywheel and thus promote the dissipation of heat. For example, the flywheel 3 can be made of steel and its left-hand side (as viewed in FIG. 1) can be provided with a set of rhomboidal or otherwise configurated projections or protuberances which provide a much larger composite surface for dissipation of heat, i.e., for contact with relatively cool air in the surrounding atmosphere. The pattern of projections or protuberances can be provided during final shaping (calibration) of the flywheel 3. It is also possible to treat the finished secondary flywheel 3 in a machine tool which is designed to remove material from the side facing away from the friction surface 3a, e.g., to provide such side with one or more spiral grooves. Alternatively, that side of the flywheel 3 which faces away from the friction surface 3a can be acted upon by a circular milling cutter which is caused to repeatedly penetrate into the flywheel 3 at a plurality of locations at different distances from the axis of the composite flywheel 1 and at different distances from each other as seen in the circumferential direction of the composite flywheel. If the secondary flywheel 3 is a casting, its heat dissipating characteristics can be enhanced during making, i.e., by utilizing a form or mold which ensures the provision of grooves, other recesses and/or protuberances in that side of the finished casting which faces away from the friction surface 3a.

The annular chamber 11 between the primary flywheel 2 and the carrier 20 is at least partially filled with a preferably viscous paste-like lubricant for the energy storing elements 10 as well as for the arms 21 of the flange 22 and those surfaces of the end portion 18 of the flywheel 2 and radially inwardly extending portion 29 of the carrier 20 which are immediately adjacent the chamber 11. A circular sealing device 24 (here shown as a membrane) is provided to seal the radially inner portion of the chamber 11 from the atmosphere. The illustrated sealing device 24 is a membrane which is of one piece and the radially inner portion of which is sealingly clamped between the flange 22 and the adjacent portion of the secondary flywheel 3, e.g., by rivets 23 which serve to non-rotatably connect the flange 22 to the flywheel 3. The radially outermost portion of the resilient membrane-like sealing device 24 bears against the radially innermost part of the radially inwardly extending portion 29 of the carrier 20. The latter can be made from metallic sheet material, the same as the flywheel 3 and/or 2. FIG. 1 further shows that the sealing device 24 can include a plurality of annular portions which are offset relative to each other in the axial direction of the composite flywheel 1.

The sealing device 24 need not necessarily establish a highly reliable fluid-tight seal. It normally suffices to ensure that the sealing device 24 can intercept any solid matter which would tend to penetrate into the chamber 11 at the radially innermost part 25 of the carrier portion 29. The reason is that, as a rule, the supply of lubricant in the chamber 11 is a highly viscous paste or grease which is unlikely to flow from the compartment 12 radially inwardly toward the radially innermost part 25, especially if the secondary flywheel 3 is properly cooled so that it cannot cause a pronounced or excessive reduction of viscosity of the confined lubricant. As a rule, the likelihood of a pronounced reduction of viscosity of the lubricant which is confined in the chamber 11 is very remote. In addition, the just described sealing device 24 is capable of preventing the escape of lubricant along the radially innermost part 25 of the carrier portion 29 if the need for such sealing action arises while the improved apparatus is in use.

The primary flywheel 2 carries a customary starter gear 26 which is welded, shrunk onto or otherwise securely affixed to the outer side of the end portion 18.

The apparatus which is shown in FIGS. 1 and 2 can be assembled with a friction clutch (inclusive of the clutch disc having friction linings located between the friction surface 3a of the secondary flywheel 3 and the friction surface of the customary axially movable pressure plate) to constitute an assembly which is ready to be affixed to the output element of an engine. The making of such assembly simplifies the shipment as well as storage and installation of the apparatus. Thus, it is then possible to dispense with a number of steps or operations which are necessary if the friction clutch and the composite flywheel are not assembled at the manufacturing plant. For example, one can dispense with the step of centering the friction disc between the pressure plate of the friction clutch and the secondary flywheel 3 at the locale of use (e.g., in an automobile assembling plant) if the centering of the clutch disc is completed in the factory which turns out the friction clutches and/or the composite flywheels. Also, it is possible to dispense with the step of inserting the clutch disc between the pressure plate of the friction clutch and the secondary flywheel 3, with the step of mounting the clutch on the secondary flywheel 3, with the application of a standard centering mandrel which is necessary if the friction clutch and the composite flywheel 1 are to be assembled in an automobile making plant, with centering of the clutch disc between the pressure plate and the secondary flywheel 3, with the insertion of fasteners into the holes or bores 5 preparatory to securing the primary flywheel to the output element of an engine, and with the withdrawal of the centering mandrel upon completed attachment of the primary flywheel to the output element of the engine.

The aforediscussed assembly of a friction clutch and composite flywheel 1 can already include the antifriction bearing 4, i.e., such a bearing can be mounted on the end portion 15a of the hub 15 and within the radially inner portion of the flywheel 3 before the thus obtained assembly is shipped to the locus of use. The bolts or other fasteners which are to secure the radially inner portion 14 of the main section 13 of the primary flywheel 2 to the output element of the engine can be inserted into the holes or bores 5 at the plant where the improved apparatus is assembled with a friction clutch. Such fasteners can include bolts having heads with hexagonal sockets and shanks which extend into the respective holes or bore 5 and are releasably held therein so that the shanks can move relative to the main section 13 when their heads are engaged by suitable torque transmitting tools. The means for releasably holding the shanks of bolts in the respective holes or bores 5 can constitute inserts of elastomeric material which are sufficiently reliable to prevent unintentional displacement of the bolts relative to the main section 13, but can readily yield if a torque transmitting tool is caused to enter the sockets in the heads of such bolts for the purpose of driving the shanks into the tapped bores or holes of the output element of an engine. Temporary fixing of the bolts to the main section 13 of the primary flywheel 2 is advisable and advantageous because the mounting of the assembly of composite flywheel and friction clutch on the output element of an engine can be completed within a short interval of time. This is due to the fact that the bolts are already held in requisite positions as soon as the primary flywheel 2 is properly oriented relative to the output element of the engine. Moreover, the bolts cannot be lost during shipment and/or in storage. Reference may be had, for example, to FIG. 1 of the aforementioned U.S. Pat. No. 5,156,249 to Friedmann. Thus, suitably dimensioned holes or windows in the customary diaphragm spring and clutch disc of the friction clutch can be dimensioned and positioned relative to the holes or bores 5 in such a way that the heads of the bolts can pass through the holes of the clutch disc but not through the holes of the diaphragm spring. This means that such bolts are then entrapped between the diaphragm spring of the friction clutch and the primary flywheel 2 and are ready to be driven home into the output element of the engine when the assembly of the improved apparatus with a friction clutch is ready to be installed in a motor vehicle. The pressure plate of the friction clutch biases the friction linings of the clutch disc against the friction surface 3a of the secondary flywheel 3 so that the clutch disc remains in properly centered position. The holes in the diaphragm spring of the friction clutch are dimensioned in such a way that they permit passage of the working end of a tool which is to engage and transmit torque to the heads of confined bolts in order to drive the shanks of such bolts into the output element of the engine. It is also possible to select the dimensions of holes in the clutch disc in such a way that the heads of bolts (whose shanks extend into the bores or holes 5) are confined between the clutch disc and the main section 13 of the primary flywheel 2. The aforementioned openings or holes in the diaphragm spring of the friction clutch can constitute enlarged portions of slots between neighboring prongs of the diaphragm spring. Once an assembly or aggregate including the improved apparatus and a friction clutch is properly oriented relative to the output element of the engine, the aforementioned torque transmitting tool or tools are put to use to drive the shanks of the bolts into the tapped bores or holes of the output element. The dimensions of the holes in the diaphragm spring and/or in the clutch disc are selected in such a way that a tool can pass through such holes but that the heads of the bolts remain confined between the primary flywheel and the diaphragm spring. Reference may be had to commonly owned U.S. Pat. No. 5,160,007 granted Nov. 3, 1992 to Reik et al. for "Apparatus for Transmitting Torque in the Power Trains of Motor Vehicles" which shows a torque transmitting tool as well as an assembly of a composite flywheel and a friction clutch.

The secondary flywheel 3 is provided with one or more passages 27 which permit cool atmospheric air to flow from the side including the friction surface 3a to the other side in order to supply streams of air into the range of the flange 22 and main section 13 of the primary flywheel 2. The passages 27 can constitute elongated slots (see FIG. 2) which extend circumferentially of the bearing 4 and alternate with the holes or bores 5. The provision of such passages further reduces the likelihood of overheating of the normally highly viscous lubricant in the chamber 11 and/or in its compartment 12 when the improved apparatus is in actual use. Furthermore, adequate cooling of the secondary flywheel 3 prolongs the useful life of such parts as well as the useful life of the entire apparatus.

The assembly of the improved apparatus and a friction clutch can be further provided with a pilot bearing which is installed at the hub 15 and serves to center the input element of a transmission in the output element of the engine.

Still further, the improved apparatus can comprise one or more friction generating devices which are interposed between the flywheels 2 and 3 to oppose certain or all angular displacements of such flywheels relative to each other. Reference may be had, for example, to the aforementioned commonly owned U.S. Pat. No. 4,723,463 to Reik et al. If the apparatus employs two or more friction generating devices, such devices may but need not be identical or similar, and each of two or more discrete friction generating devices can oppose the same or a different range of angular displacements of the flywheels 2 and 3 relative to each other. For example, one or more friction generating devices can be constructed and assembled to oppose a later stage of angular displacement of the flywheels 2 and 3 relative to each other.

In accordance with a presently preferred embodiment, the carrier 20 is made by deep drawing a disc-shaped blank of metallic sheet material. When the drawing step is completed, the central part of the radially extending end wall or bottom wall is removed to thus leave the aforementioned radially inwardly extending washer-like portion 29 which, when the carrier 20 is installed in the primary flywheel 2, bounds a portion of the chamber 11. As a rule, the deep drawing operation results in the making of a carrier 20 which is ready for insertion into the axially extending portion or part 19 of the end portion 18. However, it is equally within the purview of the invention to calibrate and/or otherwise treat the deep drawn converted blank in order to further enhance its accuracy. An accurately finished carrier 20 is ready for insertion into the part 19, whereby the primary flywheel 2 and the carrier 20 are automatically and accurately centered relative to each other without any additional treatment. Thus, it is important to ensure that the outer diameter of the sleeve-like portion 28 of the carrier 20 as well as the inner diameter of the part 19 match or at least closely approximate predetermined optimal or desired diameters.

The radially inwardly extending washer-like portion 29 of the finished carrier 20 is provided with the aforementioned sealing surface 25 which is engaged by the radially innermost portion of the sealing device 24 to prevent penetration of foreign matter into the chamber 11 and/or to prevent escape of overheated lubricant from the chamber 11. The radially inner portion of the sealing device 24 and the sealing surface 25 are slidable relative to each other so that the device 21 and the carrier 20 provide a so-called contact seal.

The carrier 20 further comprises a substantially frustoconical intermediate portion 30 which is disposed between the portions 28, 29 and tapers in a direction toward the main section 13 of the primary flywheel 2. The apex of an imaginary cone including the frustoconical intermediate portion 30 is preferably disposed on the common axis of the flywheels 2, 3 at a location to the left of the main section 13 (as seen in FIG. 1). The intermediate portion 30 of the carrier 20 cooperates with the adjacent complementary part 18a of the end portion 18 to provide abutments or stops which limit the extent of penetration of the carrier into the primary flywheel 2 in an optimum position of the portion 29, i.e., the pockets 32 of the portion 29 are then located opposite similar pockets, which are formed in the end portion 18 of the primary flywheel 2. Further, the dimensions of the compartment 12 are then such that the energy storing elements 10 of the damper 9 are received therein with optimal clearance. In other words, each projection or partition 31 of the carrier 20 then assumes a position of optimum orientation relative to the adjacent partition of the end portion 18. The configuration of those parts of the end portion 18 and portion 29 which are adjacent the compartment 12 is preferably such that the confronting surfaces of the portions 18 and 29 rather closely follow the outlines of the energy storing elements 10. In other words, the energy storing elements 10 are rather snugly received in the respective arcuate sections of the compartment 12 when the assembly of the primary flywheel 2 and the carrier 20 is completed.

That edge face of the sleeve-like portion 28 of the carrier 20 which faces away from the primary flywheel 2 is provided with one or more suitably distributed recesses or notches 37. The portion 28 further includes the aforementioned cylindrical part 33 which merges gradually into the intermediate portion 30 and serves to center the carrier 20 in the part 19 of the end portion 18. It is presently preferred to form the seam 20a by resorting to a laser welding apparatus. In order to enhance the quality of the seam 20a, it is often desirable and advantageous to provide the part 19 with a circumferentially complete groove 34 which weakens the part 19 by reducing its thickness and thus establishes more satisfactory conditions for the making of a highly satisfactory welded seam. The seam 20a extends from the bottom of the groove 34 to the adjacent part 33 of the sleeve-like portion 28 forming part of the carrier 20.

The sleeve-like portion 28 of the carrier 20 further comprises a radially outwardly flaring part 35 which is spaced apart from the frustoconical part 30 and which, in turn, merges into an end portion 36 having a somewhat larger inner diameter. The wall thickness of the part 19 is reduced or the inner diameter of such part is slightly increased to ensure that the part 19 snugly receives and centers the sleeve-like portion 28 of the carrier 20. The part 19 receives the intermediate portion 30, the part 33 of the sleeve-like portion 28 and a part of the portion 36 of the sleeve-like portion 28 of the carrier 20.

A substantial part (or the major part) of the portion 36 projects axially of the flywheels 2, 3 and outwardly beyond the part 19 of the end portion 18, i.e., in a direction away from the engine whose output element carries the main section 13 of the primary flywheel 2. Such projecting part of the portion 36 can be said to constitute the radially outermost portion of the left-hand axial end of the composite flywheel 1 (this is based on the premise that, due to the provision of the welded seam 20a, the carrier 20 is considered as part of the primary flywheel 2). FIG. 1 further shows that the part 19 of the end portion 18 of the primary flywheel 2 and the parts 35, 36 of the carrier 20 project axially and away from the engine and beyond the friction surface 3a of the secondary flywheel 3. Thus, at least the entire portion 36 of the sleeve-like portion 28 of the carrier 20 can project axially beyond the secondary flywheel 3 to spacedly surround the friction surface 3a. The part 36 can also surround a portion of the housing or casing of the friction clutch (not shown in FIGS. 1 and 2); the housing of the friction clutch is affixed to and rotates with the secondary flywheel 3.

The aforementioned recess or cutout 37 is provided in that part of the portion 36 which projects beyond the part 19 of the end portion 18 of the primary flywheel 2. FIG. 2 shows two recesses 37 which are spaced apart from each other in the circumferential direction of the flywheel 2. These recesses constitute signal generators which are tracked by a beam of radiation or by a mechanical sensor to cause the generation of a signal whenever one of the recesses 37 advances past the monitoring station. One purpose of signals which are generated in response to detection of the recesses 37 is to ensure proper operation of a so-called motor management system. For example, the signals which are generated in response to detection of the one and/or the other recess 37 can be transmitted to an RPM counter and/or to a device which monitors the frequency of orbiting of the recess(es) 37 past the monitoring station in order to ascertain eventual irregularities of rotational speed of the composite flywheel 1. Still further, signals which are generated in response to detection of the one and/or the other recess 37 can be utilized to control the position of the gas pedal in a motor vehicle, the position of the valving element in a throttle valve, and so forth. Such signals are also useful when an engine which rotates the primary flywheel 2 is mounted in a test stand or on a so-called diagnosis stand.

The illustrated signal generators 37 are shown as recesses in the portion 36 of the sleeve-like portion 28 of the carrier 20. These recesses can be said to constitute relatively thin portions of the carrier 20, namely portions having zero thickness. However, it is equally possible to provide the carrier 20 with other types of signal generators, e.g., with signal generators in the form of holes or bores. In other words, the signal generators need not be open at that edge face of the sleeve-like portion 28 which faces away from the engine. It is further possible to provide the external surface of the sleeve-like portion 28 with one or more notches which are tracked by one or more detectors to initiate the generation of signals. In other words, it is not necessary to place the signal generator or generators immediately adjacent or into the exposed edge face of the sleeve-like portion 28, and it is not necessary to form one or more signal generators by removing material of the sleeve-like portion 28 all the way from its external surface to its internal surface. All that counts is to provide one or more signal generators which can be readily tracked to initiate the generation of signals suitable for further processing in a motor management system or the like. The exact dimensions and/or shapes of the signal generators are less important. For example, one will resort to signal generators in the form of holes or bores if the part 36 should not be unduly weakened due to the provision of one or more signal generators therein. As already mentioned above, it is sufficient to provide recesses which do not extend all the way through the portion 36 and all the way to the exposed edge face of this portion, as long as the recesses are readily detectable. It is also possible to provide signal generators in the form of protuberances.

It is presently preferred to provide the carrier 20 with signal generators in the form of recesses 37 or notches extending all the way between the internal and external surfaces of the portion 36 and open at the edge face of the portion 36. Such recesses can be formed at a low cost and in readily available machines. Moreover, such recesses can be readily tracked by a variety of available detectors. The recesses 37 can be provided in a metallic blank which is thereupon converted into a cupped body, and such cupped body is thereupon converted into the carrier 20 by removing the central portion of the end wall of the cupped body, i.e., by leaving only the sleeve-like portion 28 and the washer-like portion 29 as well as the intermediate portion 30 which constitutes a transition between the adjacent parts of the portions 28 and 29.

As shown in FIG. 1, the portion 28 of the carrier 20 includes parts or zones having different diameters. This is desirable and advantageous because it renders it possible to properly insert the carrier 20 into the part 19 of the end portion 18 so that the washer-like portion 29 is located at an optimum distance from the radially extending part of the main section 13 of the primary flywheel 2 and that the recesses 37 remain exposed so that they can be readily tracked by an optical detector, by a mechanical detector or in any other suitable way.

The provision of abutments or stops (such as 30 on the carrier 20) is desirable and advantageous because these abutments ensure that a carrier 20 can be repeatedly inserted into and withdrawn from the part 19 in such a way that the washer-like portion 29 of the inserted carrier always assumes an optimum (predetermined) axial position relative to the main section 13 of the primary flywheel 2.

Though the part 19 can constitute a separately produced component which is affixed to the end portion 18 of the main section 13, it is presently preferred to make the entire primary flywheel 2 of one piece, preferably by properly deforming a blank, such as a substantially cup-shaped blank consisting of a suitable metallic sheet material.

The main section 13 (with the portion 18 and its part 19) and the carrier 20 can be said to constitute two portions of a composite primary flywheel, and such portions cooperate to define the aforementioned annular chamber 11 with compartment 12 for the energy storing elements 10 of the damper 9. It will be noted that the portions 19 and 28 (which extend in the axial direction of the composite flywheel 1) are located radially outwardly of the energy storing elements 10.

An important advantage of the improved apparatus is that the aforediscussed construction, configuration and mounting of the primary flywheel 2 (especially of the axially elongated part 19) and of the sleeve-like portion 28 of the carrier 20 render it possible to select the overall mass of the primary flywheel (including the components 2 and 20) with a very high degree of accuracy. This, in turn, renders it possible to ensure optimal distribution of the moment of inertia all the way from the radially innermost part to the radially outermost part of the primary flywheel. For example, the ratio of the moments of inertia of the masses of the primary and secondary flywheels 2, 3 can be selected to be in the range of 1 to 0.6.

Another important advantage of the improved apparatus is that the signal generator(s) 37 and/or other types of signal generators can be formed and finished at the time of making the carrier 20 or during installation of the carrier in the part 19 of the end portion 18.

The improved apparatus is susceptible of numerous additional modifications without departing from the spirit of the invention. For example, the improved apparatus can be modified to incorporate certain features of apparatus which are described and shown in the aforementioned commonly owned U.S. patents. The disclosures of such patents are incorporated herein by reference. Furthermore, applicants believe that at least some features of the composite flywheel 1 and/or of the carrier 20 are novel and patentable per se. Still further, applicants also consider as their invention the aforedescribed method of assembling the primary flywheel 2 with the carrier 20 or of assembling the carrier 20 (or its equivalents) with composite flywheels other than that specifically shown in the drawings of the present application.

Without further analysis, the foregoing will fully reveal the gist of the present invention in sufficient detail that others can, by applying current knowledge, readily adapt it for various applications without omitting features that, from the standpoint of the prior art, fairly constitute essential characteristics of the generic and specific aspects of our contribution to the art and, therefore, such adaptations should and are intended to be comprehended within the meaning and range of equivalence of the appended claims.

What is claimed is:

1. The apparatus for compensating for fluctuations of torque comprising:
    a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;
    at least one starter ring gear fixed to said first flywheel;
    a bearing between said first and second flywheels;
    at least one damper including means for opposing rotation of said first and second flywheels relative to each other; and
    a substantially collar-shaped carrier rigidly fasted with said first flywheel and extending in parallel with the common axis of said flywheels in a direction away from the engine and beyond said friction surface, said carrier having at least one signal generator.

2. The apparatus of claim 1, wherein said at least one signal generator includes a recess in said carrier.
3. The apparatus of claim 1, wherein said carrier is made, at least in part, of a metallic material.
4. The apparatus of claim 1, wherein said carrier has a substantially L-shaped cross-sectional outline.
5. The apparatus of claim 1, wherein said carrier comprises a plurality of portions having different diameters.
6. The apparatus of claim 1, wherein said carrier and at least one of said first and second flywheels define an annular chamber and said carrier includes a portion which seals said chamber from the atmosphere.
7. The apparatus of claim 6, further comprising a sealing element engaging said portion of said carrier.
8. The apparatus of claim 7, wherein said sealing element includes a membrane.
9. The apparatus of claim 1, wherein said at least one signal generator extends beyond said second flywheel in a direction away from the engine substantially axially of said flywheels.
10. Apparatus for compensating for fluctuations of torque comprising:
    a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;
    a bearing between said first and second flywheels;
    at least one damper including means for opposing rotation of said first and second flywheels relative to each other; and
    a substantially collar-shaped carrier rigidly fastened with said first flywheel and extending in parallel with the common axis of said flywheels in a direction away from the engine and beyond said friction surface, said carrier having at least one signal generator;
    wherein said carrier includes an annular portion having a first thickness, as seen in the radial direction of said common axis, said at least one signal generator having a second thickness less than said first thickness.
11. The apparatus of claim 10, wherein said at least one signal generator is provided in said annular portion and is obtained as a result of removal of material from said annular portion.
12. Apparatus for compensating for fluctuations of torque comprising:
    a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;
    a bearing between said first and second flywheels;
    at least one damper including means for opposing rotation of said first and second flywheels relative to each other; and
    a substantially collar-shaped carrier rigidly fastened with said first flywheel and extending in parallel with the common axis of said flywheels in a direction away from the engine and beyond said friction surface, said carrier having at least one signal generator; wherein said at least one signal generator has a recess with an open side facing away from the engine.

13. Apparatus for compensating for fluctuations of torque comprising:
- a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;
- a bearing between said first and second flywheels;
- at least one damper including means for opposing rotation of said first and second flywheels relative to each other; and
- a substantially collar-shaped carrier rigidly fastened with said first flywheel and extending in parallel with the common axis of said flywheels in a direction away from the engine and beyond said friction surface, said carrier having at least one signal generator; wherein said carrier is made of sheet metal.

14. Apparatus for compensating for fluctuations of torque comprising:
- a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;
- a bearing between said first and second flywheel;
- at least one damper including means for opposing rotation of said first and second flywheels relative to each other; and
- a substantially collar-shaped carrier rigidly fastened with said first flywheel and extending in parallel with the common axis of said flywheels in a direction away from the engine and beyond said friction surface, said carrier having at least one signal generator; wherein said carrier constitutes a converted substantially cup-shaped blank.

15. Apparatus for compensating for fluctuations of torque comprising:
- a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;
- a bearing between said first and second flywheels;
- at least one damper including means for opposing rotation of said first and second flywheels relative to each other; and
- a substantially collar-shaped carrier rigidly fastened with said first flywheel and extending in parallel with the common axis of said flywheels in a direction away from the engine and beyond said friction surface, said carrier having at least one signal generator; wherein said first flywheel includes a portion extending in the direction of said axis and further comprising means for securing said portion of said first flywheel to said carrier.

16. The apparatus of claim 15, wherein said portion of said first flywheel at least partially surrounds said carrier.

17. The apparatus of claim 15, wherein said carrier is centered by said portion of said first flywheel.

18. The apparatus of claim 15, wherein said carrier extends into said portion of said first flywheel and at least one of said carrier and said portion of said first flywheel includes means for limiting the extent of penetration of said carrier into said portion of said first flywheel.

19. Apparatus for compensating for fluctuations of torque comprising:
- a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;
- a bearing between said first and second flywheels;
- at least one damper including means for opposing rotation of said first and second flywheels relative to each other; and
- a substantially collar-shaped carrier rigidly fastened with said first flywheel and extending in parallel with the common axis of said flywheels in a direction away from the engine and beyond said friction surface, said carrier having at least one signal generator; wherein said first flywheel includes an annular portion which surrounds at least a portion of and is sealingly connected with said carrier.

20. The apparatus of claim 19, wherein said portions of said carrier and said first flywheel are sealingly connected to each other by at least one welded seam.

21. The apparatus of claim 19, wherein said first flywheel further comprises a main portion which is in one piece with said annular portion.

22. The apparatus of claim 19, wherein said first flywheel is a converted blank of sheet metal.

23. The apparatus of claim 22, wherein said blank is a substantially cupped piece of metallic sheet material.

24. Apparatus for compensating for fluctuations of torque comprising:
- a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;
- a bearing between said first and second flywheels;
- at least one damper including means for opposing rotation of said first and second flywheels relative to each other; and
- a substantially collar-shaped carrier rigidly fastened with said first flywheel and extending in parallel with the common axis of said flywheels in a direction away from the engine and beyond said friction surface, said carrier having at least one signal generator; wherein said carrier includes a portion extending substantially radially inwardly toward said axis and includes abutments for resilient elements that form part of said at least one damper and act in the circumferential direction of said flywheels.

25. Apparatus for compensating for fluctuations of torque comprising:
- a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;

a bearing between said first and second flywheels;

at least one damper including means for opposing rotation of said first and second flywheels relative to each other; and a substantially collar-shaped carrier rigidly fastened with said first flywheel and extending in parallel with the common axis of said flywheels in a direction away from the engine and beyond said friction surface, said carrier having at least one signal generator; wherein said at least one damper comprises a plurality of energy storing elements acting in the circumferential direction of said flywheels, said carrier and at least one of said flywheels defining an at least partially sealed annular chamber for said energy storing elements, and further comprising a supply of lubricant in said chamber.

26. The apparatus of claim 25, wherein at least a portion of said carrier comprises a metallic material.

27. Apparatus for compensating for fluctuations of torque comprising:

a composite flywheel assembly having a plurality of coaxial flywheels including a first flywheel connectable with an output element of an engine and a second flywheel connectable with an input element of a transmission and having a friction surface engageable by a clutch disc of a friction clutch, said flywheels being rotatable relative to each other;

a bearing between said first and second flywheels;

at least one damper including means for opposing rotation of said first and second flywheels relative to each other; and a substantially collar-shaped carrier rigidly fastened with said first flywheel and extending in parallel with the common axis of said flywheels in a direction away from the engine and beyond said friction surface, said carrier having at least one signal generator; wherein said first flywheel comprises two profiled components of metallic sheet material, said components defining an annular chamber and said at least one damper including energy storing elements in said chamber, said components including portions extending in the direction of said axis away from the engine.

28. The apparatus of claim 27, wherein said energy storing elements are disposed at a first radial distance from said axis and said portions of said components are located at a greater second radial distance from said axis.

* * * * *